(12) United States Patent
Inada (10) Patent No.: US 12,405,160 B2
(45) Date of Patent: Sep. 2, 2025

(54) SYSTEM, INFORMATION PROCESSING DEVICE, INFORMATION PROCESSING METHOD, AND PROGRAM

(71) Applicant: Sony Interactive Entertainment Inc., Tokyo (JP)

(72) Inventor: Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 366 days.

(21) Appl. No.: 17/610,530

(22) PCT Filed: Jun. 25, 2019

(86) PCT No.: PCT/JP2019/025111
§ 371 (c)(1),
(2) Date: Nov. 11, 2021

(87) PCT Pub. No.: WO2020/261369
PCT Pub. Date: Dec. 30, 2020

(65) Prior Publication Data
US 2022/0228907 A1   Jul. 21, 2022

(51) Int. Cl.
*H04N 5/353* (2011.01)
*G01J 1/42* (2006.01)
(Continued)

(52) U.S. Cl.
CPC ............. *G01J 1/42* (2013.01); *H04N 25/50* (2023.01); *H04N 25/702* (2023.01)

(58) Field of Classification Search
CPC .......... G01J 1/42; H04N 5/353; H04N 5/378; H04N 5/376; H04N 5/3765; H04N 5/232
(Continued)

(56) References Cited

U.S. PATENT DOCUMENTS 9,001,220 B2 * 4/2015 Kim ................. H04N 25/42
                                                     348/222.1
9,389,693 B2   7/2016 Lee
(Continued)

FOREIGN PATENT DOCUMENTS

CN    106709895 A    5/2017
EP      3168810 A1   5/2017
(Continued)

OTHER PUBLICATIONS

Extended European Search Report for corresponding EP Application No. 19935509.0, 7 pages, dated Dec. 21, 2022.
(Continued)

*Primary Examiner* — Trang U Tran
(74) *Attorney, Agent, or Firm* — Kilpatrick Townsend & Stockton LLP (57) ABSTRACT

Provided is a system including an event-driven vision sensor including a sensor array in which a first sensor and a second sensor are arrayed in a predetermined pattern, the first sensor being configured to generate a first event signal when detecting a change in intensity of light larger than a first threshold, the second sensor being configured to generate a second event signal when detecting a change in intensity of light larger than a second threshold larger than the first threshold, and an information processing device including a first processing unit configured to execute first processing when the first event signal is received and the second event signal is not received, and a second processing unit configured to execute second processing different from the first processing when the second event signal is received.

19 Claims, 7 Drawing Sheets

(51) Int. Cl.
  *H04N 25/50* (2023.01)
  *H04N 25/702* (2023.01)
(58) Field of Classification Search
  USPC .......................................................... 348/180
  See application file for complete search history.

(56) References Cited

U.S. PATENT DOCUMENTS

| | | | |
|---|---|---|---|
| 9,842,400 | B2 | 12/2017 | Shin |
| 10,096,091 | B2 | 10/2018 | Lee |
| 10,337,914 | B2 | 7/2019 | Kim |
| 10,516,841 | B2 | 12/2019 | Kim |
| 10,909,824 | B2* | 2/2021 | Yaffe ...................... H04N 25/40 |
| 11,122,224 | B2 | 9/2021 | Suh |
| 2014/0320403 | A1 | 10/2014 | Lee |
| 2016/0187196 | A1 | 6/2016 | Kim |
| 2016/0217584 | A1 | 7/2016 | Shin |
| 2017/0140509 | A1 | 5/2017 | Lee |
| 2018/0146149 | A1 | 5/2018 | Suh |
| 2018/0262703 | A1 | 9/2018 | Kim |
| 2018/0262705 | A1* | 9/2018 | Park ...................... H04N 25/79 |
| 2018/0295298 | A1 | 10/2018 | Zamir |
| 2019/0362256 | A1* | 11/2019 | Lang ........................ G06N 7/01 |

FOREIGN PATENT DOCUMENTS

| | | | |
|---|---|---|---|
| JP | 2006074419 | A | 3/2006 |
| JP | 2014535098 | A | 12/2014 |
| JP | 2016201713 | A | 12/2016 |
| JP | 2017091518 | A | 5/2017 |
| JP | 2018085725 | A | 5/2018 |
| JP | 2018148553 | A | 9/2018 |
| KR | 20160079532 | A | 7/2016 |
| KR | 20160092289 | A | 8/2016 |

OTHER PUBLICATIONS

International Search Report for corresponding PCT Application No. PCT/JP2019/025111, 3 pages, dated Sep. 10, 2019.
Notice of Reasons for Refusal for corresponding JP Application No. 2022-176169, 8 pages, dated Sep. 11, 2023.
The First Office Action for corresponding CN Application No. 201980097641.4, 17 pages, dated Oct. 16, 2023.
Preliminary Rejection for corresponding KR Application No. 1020217040396, 9 pages, dated Jan. 15, 2024.

* cited by examiner

SYSTEM, INFORMATION PROCESSING DEVICE, INFORMATION PROCESSING METHOD, AND PROGRAM

TECHNICAL FIELD

The present invention relates to a system, an information processing device, an information processing method, and a program.

BACKGROUND ART

There have been known event-driven vision sensors in which a pixel detects a change in intensity of incident light to time-asynchronously generate a signal. The event-driven vision sensors are advantageous over frame vision sensors configured to scan all the pixels in every predetermined period, specifically, image sensors such as charge coupled devices (CCDs) and complementary metal oxide semiconductors (CMOSs) since the event-driven vision sensors can operate at a higher speed with a lower power. Technologies related to such event-driven vision sensors are described in PTL 1 and PTL 2, for example.

CITATION LIST

Patent Literature

[PTL 1] JP 2014-535098T [PTL 2] JP 2018-85725A

SUMMARY

Technical Problem

However, although the advantages of event-driven vision sensors as described above have been known, it is hard to say that peripheral technologies considering characteristics different from those of related-art vision sensors, for example, frame vision sensors, have been sufficiently developed.

It is therefore an object of the present invention to provide a system, an information processing device, an information processing method, and a program that enable, in executing processing on the basis of an event signal that an event-driven vision sensor generates when detecting a change in intensity of light, to execute different processing for each of events that occur with different light intensities.

Solution to Problem

According to an aspect of the present invention, there is provided a system including an event-driven vision sensor including a sensor array in which a first sensor and a second sensor are arrayed in a predetermined pattern, the first sensor being configured to generate a first event signal when detecting a change in intensity of light larger than a first threshold, the second sensor being configured to generate a second event signal when detecting a change in intensity of light larger than a second threshold larger than the first threshold, and an information processing device including a first processing unit configured to execute first processing when the first event signal is received and the second event signal is not received, and a second processing unit configured to execute second processing different from the first processing when the second event signal is received.

According to another aspect of the present invention, there is provided an information processing device including a first processing unit configured to execute first processing when a first event signal that a first sensor generates when detecting a change in intensity of light larger than a first threshold is received and a second event signal that a second sensor generates when detecting a change in intensity of light larger than a second threshold larger than the first threshold is not received, the first sensor and the second sensor being arrayed in a predetermined pattern in a sensor array of an event-driven vision sensor, and a second processing unit configured to execute second processing different from the first processing when the second event signal is received.

According to still another aspect of the present invention, there is provided an information processing method including a step of executing first processing when a first event signal that a first sensor generates when detecting a change in intensity of light larger than a first threshold is received and a second event signal that a second sensor generates when detecting a change in intensity of light larger than a second threshold larger than the first threshold is not received, the first sensor and the second sensor being arrayed in a predetermined pattern in a sensor array of an event-driven vision sensor, and a step of executing second processing different from the first processing when the second event signal is received.

According to yet another aspect of the present invention, there is provided a program for causing a computer to function as an information processing device including a first processing unit configured to execute first processing when a first event signal that a first sensor generates when detecting a change in intensity of light larger than a first threshold is received and a second event signal that a second sensor generates when detecting a change in intensity of light larger than a second threshold larger than the first threshold is not received, the first sensor and the second sensor being arrayed in a predetermined pattern in a sensor array of an event-driven vision sensor, and a second processing unit configured to execute second processing different from the first processing when the second event signal is received.

DESCRIPTION OF EMBODIMENTS

Preferred embodiments of the present invention are described in detail below with reference to the accompanying drawings. Note that, in the present specification and the drawings, components having substantially the same functional configuration are denoted by the same reference signs to omit the overlapping description.

First Embodiment

Figure 1:
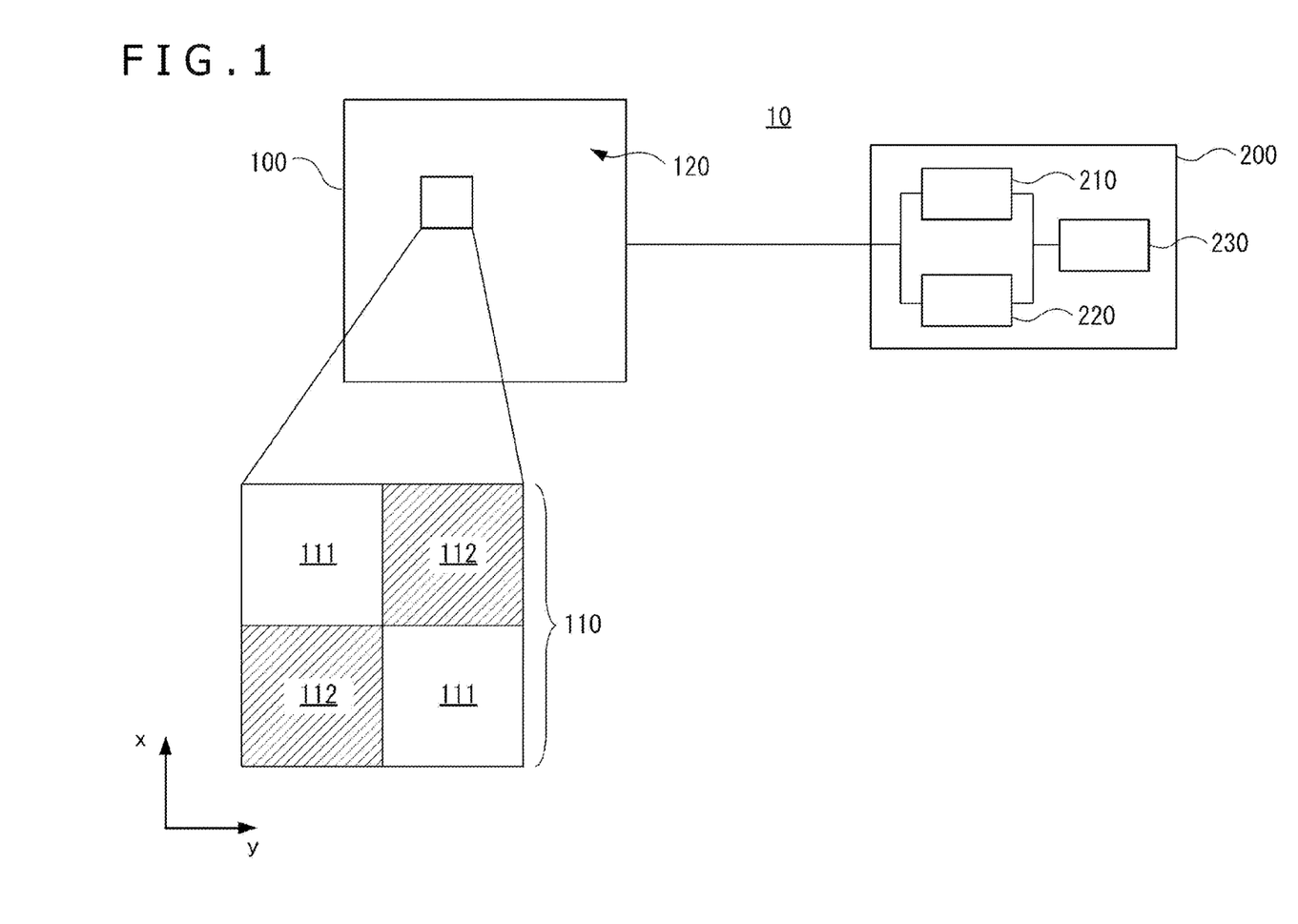
FIG. 1 is a diagram illustrating a schematic configuration of a system according to a first embodiment of the present invention.

FIG. 1 is a diagram illustrating a schematic configuration of a system according to a first embodiment of the present invention. In the example illustrated in FIG. 1, a system 10 includes an event-driven vision sensor 100 and an information processing device 200. The vision sensor 100 includes a sensor array 120. In the sensor array 120, there are arrayed sensors 110 each configured to generate an event signal when detecting a change in intensity, more specifically, a change in luminance of light incident thereon through an optical system, which is not illustrated. The sensor 110 that has not detected a change in intensity of light does not generate an event signal, and hence, the sensor 110 generates an event signal time-asynchronously in the vision sensor 100. The event signal output from the vision sensor 100 includes sensor identification information (for example, pixel position), the polarity of a luminance change (increase or decrease), and a timestamp.

In the present embodiment, the sensor 110 of the vision sensor 100 includes a first sensor 111 configured to generate an event signal when detecting a change in intensity of light larger than a first threshold $th_1$, and a second sensor 112 configured to generate an event signal when detecting a change in intensity of light larger than a second threshold $th_2$. The second threshold $th_2$ is larger than the first threshold $th_1$ ($th_2 > th_1$). In the sensor array 120, the first sensor 111 and the second sensor 112 are arrayed in a predetermined pattern, specifically, are alternately arrayed in the two directions on a plane (illustrated as an x direction and a y direction orthogonal to each other). A first event signal generated by the first sensor 111 and a second event signal generated by the second sensor 112 are distinguishable from sensor identification information included in event signals, for example.

The information processing device 200 is implemented by a computer including a communication interface, a processor, and a memory, for example, and includes functional parts of a first processing unit 210 and a second processing unit 220 implemented by the processor operating in accordance with a program stored in the memory or transmitted through the communication interface. The first processing unit 210 executes first processing when a first event signal generated by the first sensor 111 of the vision sensor 100 is received and a second event signal generated by the second sensor 112 is not received. Further, the second processing unit 220 executes second processing different from the first processing when a second event signal generated by the second sensor 112 is received. The information processing device 200 may further include a functional part of a combining processing unit 230 configured to combine the processing result of the first processing unit 210 and the processing result of the second processing unit 220.

Note that, for example, the information processing device 200 may be incorporated in the same device as the vision sensor 100, may be a terminal device disposed in the same space as the vision sensor 100 and configured to communicate with the vision sensor 100, or may be a server device connected to the vision sensor 100 via a network. Further, some functions of the information processing device 200 may be implemented by a terminal device, and the remaining functions may be implemented by a server device.

Here, as described above, the second threshold $th_2$, with which the second sensor 112 detects a change in intensity of light, is larger than the first threshold $th_1$, with which the first sensor 111 detects a change in intensity of light. Thus, in a case where a change in intensity of light larger than the first threshold $th_1$ and equal to or smaller than the second threshold $th_2$ occurs at a certain position in the angle of view of the vision sensor 100, the first sensor 111 generates an event signal, and the second sensor 112 does not generate an event signal. The first processing that is executed by the first processing unit 210 that has detected the first event signal and has not detected the second event signal in this case may be, for example, processing for a case where a relatively weak change in intensity of light occurs.

Meanwhile, in a case where a change in intensity of light larger than the second threshold $th_2$ occurs at another position in the angle of view of the vision sensor 100, the first sensor 111 and the second sensor 112 both generate event signals. The second processing that is executed by the second processing unit 220 that has detected the second event signal in this case may be, for example, processing for a case where a relatively strong change in intensity of light occurs. Note that, a first event signal is also generated when a second event signal is generated, but the second processing unit 220 may not detect the first event signal. Alternatively, the second processing unit 220 may detect a first event signal generated by the first sensor 111 near the second sensor 112 that has generated a second event signal, to thereby determine the confidence of the event using the second event signal and achieve high event resolution.

Figure 2:
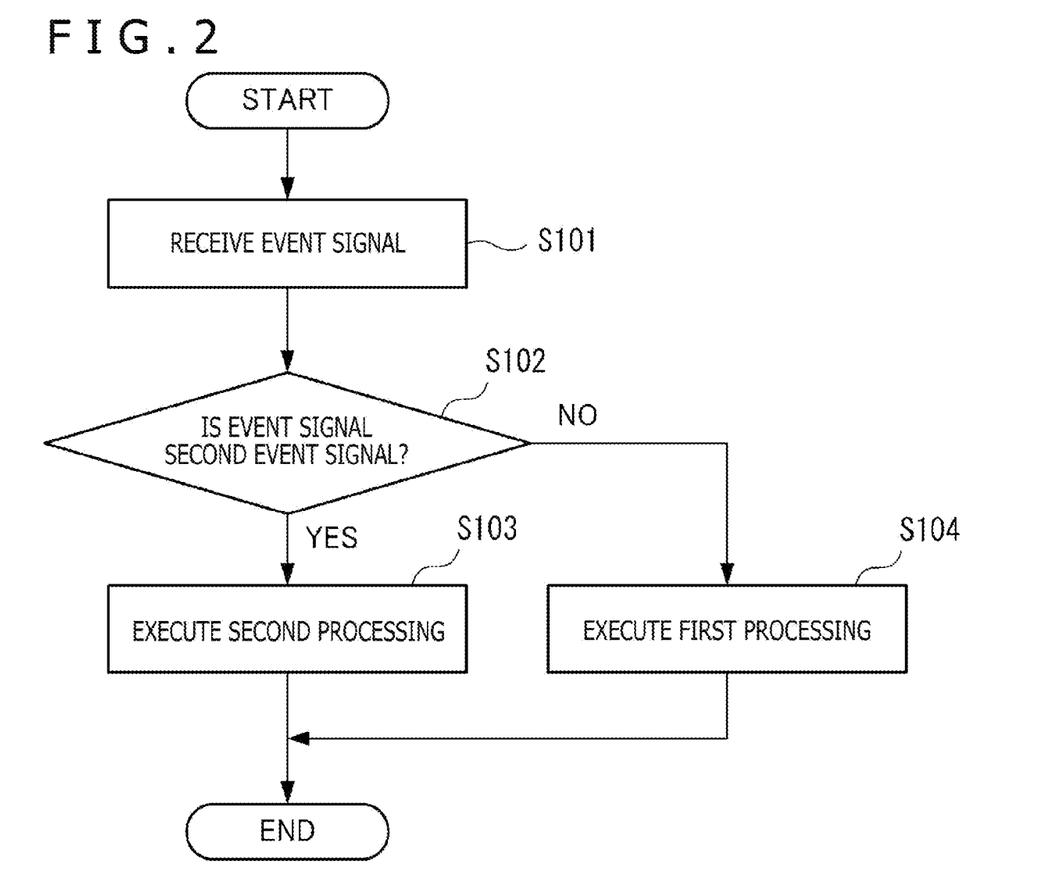
FIG. 2 is a flow chart illustrating exemplary processing in the first embodiment of the present invention.

FIG. 2 is a flow chart illustrating exemplary processing in the first embodiment of the present invention. In the example illustrated in FIG. 2, the information processing device 200 receives an event signal (Step S101), and when the received event signal is a second event signal generated by the second sensor 112 of the vision sensor 100 (YES in Step S102), the second processing unit 220 executes the second processing (Step S103). Meanwhile, when the received event signal is not a second event signal, that is, is a first event signal generated by the first sensor 111 (NO in Step S102), the first processing unit 210 executes the first processing (Step S104).

First Application Example

As a first application example, the system 10 as described above can be utilized for the processing of detecting, from event signals, the movement of a plurality of objects having different characteristics. In this case, for example, the first threshold corresponds to a luminance change amount in a case where a non-light emitting body such as a wall or floor moves, and the second threshold corresponds to a luminance change amount in a case where a light emitting body such as a light-emitting diode (LED) marker or display moves or flashes. In the information processing device 200, the first processing unit 210 executes the processing of detecting the movement of a non-light emitting body in a region in which a first event signal has been received and a second event signal has not been received. Meanwhile, the second processing unit 220 executes the processing of detecting the movement or flashing of a light emitting body in a region in which a second event signal has been received. With the processing as described above, the movement of the non-light emitting body and the movement or flashing of the light emitting body can be detected separately.

Second Application Example

Further, as a second application example, the system 10 as described above can be utilized for the processing of localizing, for example, a game controller having mounted thereon the vision sensor 100 on the basis of an event detected by the vision sensor 100. In this case, the vision sensor 100 detects an occurred event from a change in surrounding environment, and it is conceivable that the stronger the contrast of the luminance change of the event is, the more confident information indicating the change in surrounding environment is. Thus, in this case, in the information processing device 200, the first processing unit 210 executes the processing of identifying a first event having a first label in a region in which a first event signal has been received and a second event signal has not been received. The first event is handled as a relatively low confidence event in the later processing. Meanwhile, the second processing unit 220 executes the processing of identifying a second event having a second label in a region in which a second event signal has been received. At this time, in the region in which the second event signal has been received, the region in which the second event has occurred may be identified with a first event signal. The second event is handled as a relatively high confidence event in the later processing.

In the example described above, the combining processing unit 230 localizes the controller on the basis of the first event identified by the first processing unit 210 and the second event identified by the second processing unit 220. For example, in a case where the number of second events (high confidence events) is 1,500 and the number of first events (low confidence events) is 3,000 when the threshold of the number of events necessary for localization is 1,000, the combining processing unit 230 performs localization only using the second events. Meanwhile, in a case where the number of second events (high confidence events) is 100 and the number of first events (low confidence events) is 1,500, the combining processing unit 230 performs localization using both the first events and the second events. In a case where a sufficient number of second events with relatively high confidence is identified, localization is performed on the basis only of the second events, so that the accuracy of localization can be enhanced.

Figure 3:
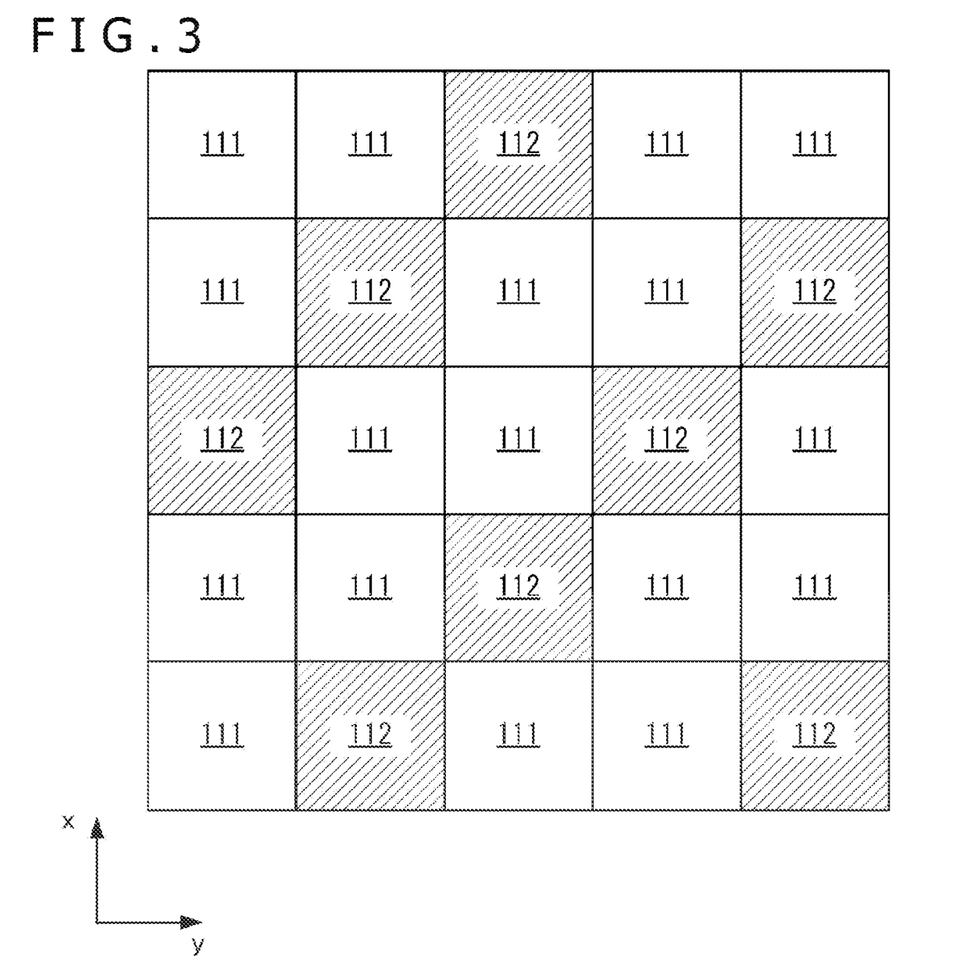
FIG. 3 is a diagram illustrating another exemplary array pattern of a sensor in the first embodiment of the present invention.

FIG. 3 is a diagram illustrating another exemplary array pattern of the sensor in the first embodiment of the present invention. In the example illustrated in FIG. 3, in the sensor array 120 of the vision sensor 100, the first sensor 111 and the second sensor 112 are unevenly arrayed. Specifically, the first sensor 111 and the second sensor 112 are alternately arrayed in the two directions on the plane (illustrated as the x direction and the y direction orthogonal to each other), but the ratio of the first sensor 111 and the second sensor 112 in each direction is 2:1. For example, in the first application example described above, the movement or flashing of a light emitting body such as an LED marker or display is a strong contrast event, and hence, the event can be accurately detected when the second sensors 112 are provided at intervals equal to or smaller than a region in which the event occurs. In such a case, the sensors can be arrayed in the uneven pattern as described above to make the region of the first sensor 111 be relatively large, thereby increasing the resolution of the event of a non-light emitting body.

Second Embodiment

Figure 4:
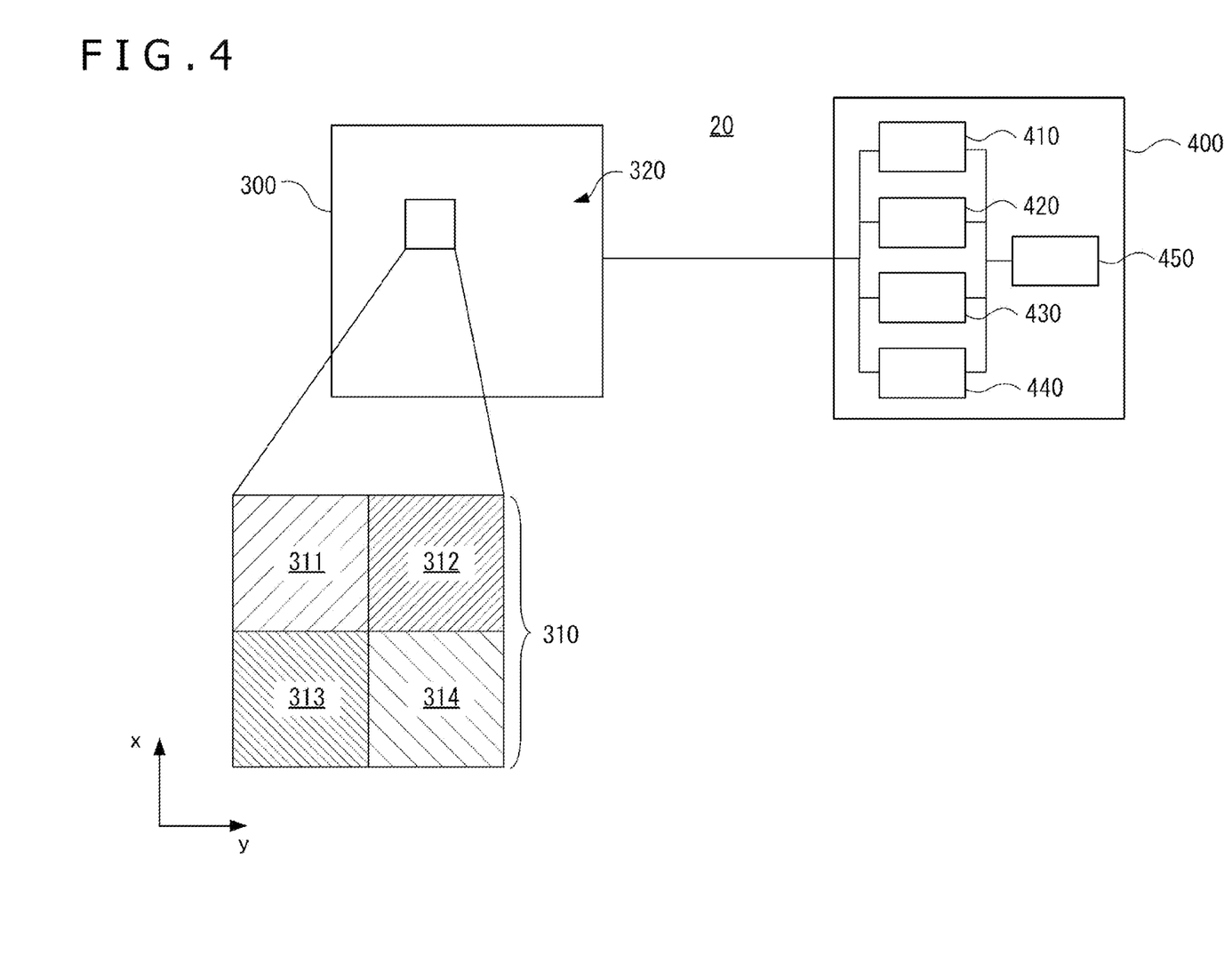
FIG. 4 is a diagram illustrating a schematic configuration of a system according to a second embodiment of the present invention.

FIG. 4 is a diagram illustrating the schematic configuration of a system according to a second embodiment of the present invention. In the example illustrated in FIG. 4, a system 20 includes an event-driven vision sensor 300 and an information processing device 400. In the present embodiment, a sensor 310 of the vision sensor 300 includes a first sensor 311 configured to generate an event signal when detecting a change in intensity of light larger than the first threshold th1, a second sensor 312 configured to generate an event signal when detecting a change in intensity of light larger than the second threshold $th_2$ larger than the first threshold $th_1$, a third sensor 313 configured to generate an event signal when detecting a change in intensity of light larger than a third threshold $th_3$ larger than the second threshold $th_2$, and a fourth sensor 314 configured to generate an event signal when detecting a change in intensity of light larger than a fourth threshold $th_4$ larger than the third threshold $th_3$ ($th_1<th_2<th_3<th_4$). In a sensor array 320, the first to fourth sensors 311 to 314 are arrayed in a predetermined pattern, specifically, are alternately arrayed in the two directions on the plane (illustrated as the x direction and the y direction orthogonal to each other). First to fourth event signals generated by the respective first to fourth sensors 311 to 314 are distinguishable from sensor identification information included in event signals, for example.

The information processing device 400 is implemented by a computer including a communication interface, a processor, and a memory, for example, and includes functional parts of first to fourth processing units 410 to 440 implemented by the processor operating in accordance with a program which is stored in the memory or received through the communication interface. The first processing unit 410 executes first processing when a first event signal is received and second to fourth event signals are not received. The second processing unit 420 executes second processing when a second event signal is received (a first event signal may also be received) and third and fourth event signals are not received. The third processing unit 430 executes third processing when a third event signal is received (first and second event signals may also be received) and a fourth event signal is not received. The fourth processing unit 440 executes fourth processing when a fourth event signal is received (first to third event signals may also be received). The first processing to the fourth processing may be different from each other. The information processing device 400 may further include a functional part of a combining processing unit 450 configured to combine the processing results of the first to fourth processing units 410 to 440.

Third Application Example

Figure 5:
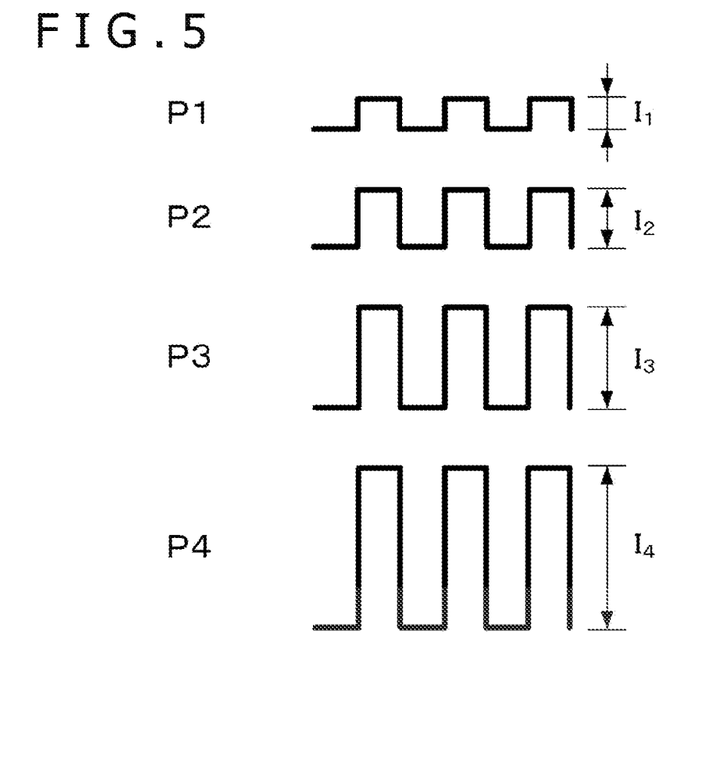
FIG. 5 is a diagram illustrating exemplary marker flashing patterns in a specific example of the second embodiment.
Figure 6:
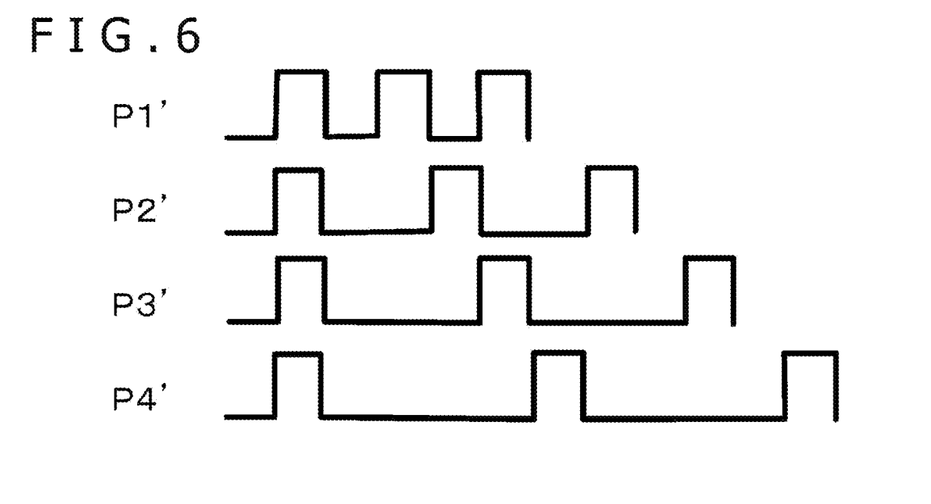
FIG. 6 is a diagram illustrating marker flashing patterns in a case where light has a fixed wavelength band.

As a third application example, the system 20 as described above can be utilized for the processing of, for example, identifying and tracking markers configured to emit light in four types of flashing patterns different from each other in intensity of light and attached to a plurality of objects that move in the angle of view of the vision sensor 300. As illustrated in FIG. 5, light intensities $I_1$, $I_2$, $I_3$, and $I_4$ of four types of marker flashing patterns P1 to P4 are set to establish the relation $th_1<I_1 \leq th_2<I_2 \leq th_3<I_3 \leq th_4<I_4$ with the thresholds $th_1$, $th_2$, $th_3$, and $th_4$ of the first to fourth sensors 311 to 314. Then, the first processing unit 410 can track the marker in the flashing pattern P1, the second processing unit 420 can track the marker in the flashing pattern P2, the third processing unit 430 can track the marker in the flashing pattern P3, and the fourth processing unit 440 can track the marker in the flashing pattern P4. For example, in a case where markers are the same in intensity of light unlike the present embodiment, to identify the markers using event signals, it is necessary that the markers be made different from each other in flashing pattern as illustrated in FIG. 6. However, in this case, as the number of types of markers to be identified increases, the periods of flashing patterns get longer, with the result that the latency increases although the event-driven vision sensor is operatable at high speed. In the example described above, as illustrated in FIG. 5, while the latency is maintained with the flashing patterns of the markers having the same period, the four types of markers can be identified.

Fourth Application Example

Figure 7:
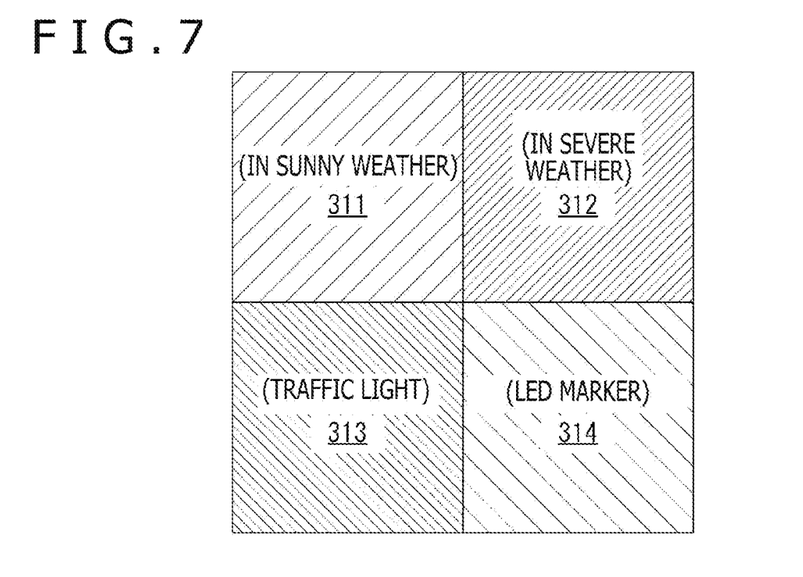
FIG. 7 is a diagram illustrating a threshold setting in an application example.

Further, as a fourth application example, the system 20 as described above can be utilized for the processing of, for example, recognizing objects around an autonomous vehicle. In this case, for example, as illustrated in FIG. 7, the thresholds $th_1$, $th_2$, $th_3$, and $th_4$ of the first to fourth sensors 311 to 314 are set to be suitable for detecting (1) non-light emitting body in sunny weather, (2) non-light emitting body in severe weather, (3) traffic light, and (4) LED marker, respectively. In this case, the first processing unit 410 recognizes a non-light emitting body in the sunny weather, the second processing unit 420 recognizes the movement of a non-light emitting body in the severe weather, the third processing unit 430 recognizes the movement and flashing of a traffic light, and the fourth processing unit 440 recognizes the movement and flashing of an LED marker. Since traffic lights and LED markers are light emitting bodies, the events thereof can be detected with a threshold higher than that for non-light emitting bodies. LED markers are attached to other vehicles to measure inter-vehicle distances, or are embedded in the road to guide the route, for example. In the severe weather, a large number of events occur due to raindrops and the like, and hence, a threshold that allows the recognition of flying objects other than raindrops and is higher than that for the sunny weather is set, so that the load of processing after event detection can be reduced. In this case, data in the sunny weather may also be used to facilitate the detection of events other than raindrops.

The system 20 according to the present embodiment may be utilized for the first and second application examples described above as the application examples of the first embodiment, that is, the processing of detecting, from event signals, the movement of a plurality of objects having different characteristics, and the processing of localization based on an event. In the localization processing, the confidence of an event is evaluated in the four grades, so that the number of events necessary for localization can be extracted in descending order of confidence (for example, there can be provided an option that, of the four grades of confidence, only events in the top two grades or the top three grades are extracted), and the accuracy of localization can thus be enhanced. Further, the system 10 according to the first embodiment can also be utilized for the processing of the third application example (tracking of two types of markers) and the processing of the fourth application example (for example, the recognition of the movement of a non-light emitting body in the sunny weather and the severe weather).

Figure 8:
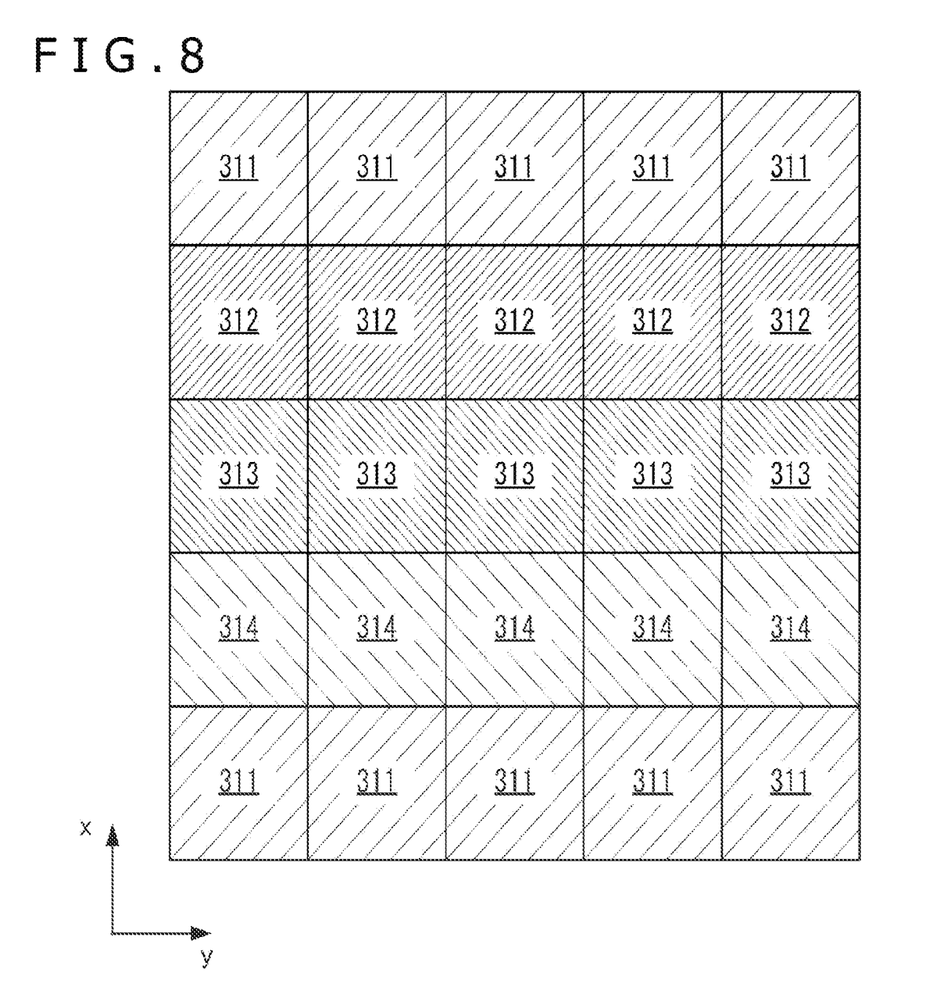
FIG. 8 is a diagram illustrating another exemplary array pattern of a filter and a sensor in the second embodiment of the present invention.

FIG. 8 is a diagram illustrating another exemplary array pattern of the sensor in the second embodiment of the present invention. In the example illustrated in FIG. 4 described above, the first to fourth sensors 311 to 314 of the vision sensor 300 are alternately arrayed in the two directions on the plane (illustrated as the x direction and the y direction orthogonal to each other). In the example illustrated in FIG. 8, however, the first to fourth sensors 311 to 314 are alternately arrayed only in the x direction. In short, the first to fourth sensors 311 to 314 are arrayed in a belt-shaped pattern with respect to the y direction. In this case, in the x direction, there is a possibility that an event that has occurred in a region smaller than a region four times as large as the pixel size of the sensor array 320 is blocked by the filter having the unmatched wavelength band, but the event is not blocked in the y direction. Meanwhile, in the example illustrated in FIG. 4 described above, an event that has occurred in a region equal to or larger than a region twice as large as the pixel size of the sensor array 320 is detected without being blocked both in the x direction and the y direction. In this way, the array pattern of the sensors can be appropriately changed depending on the size of an event to be detected in each direction, for example.

In the embodiments of the present invention as described above, the event-driven vision sensor has arranged therein the plurality of types of sensors different from each other in threshold for detecting a change in intensity of light, and the information processing device executes processing corresponding to event signals generated by the respective sensors, with the result that events that occur with different light intensities can be processed differently. Although, as the number of types of sensors (threshold levels) increases, the resolution of the detection of events having the same intensity decreases, the resolution can be compensated for by a well-known technology, for example, interpolation or extrapolation. Further, for example, as described above, in the case where an event signal generated by a sensor with a high threshold is handled as information indicating the occurrence of a relatively high confidence event, a region in which a relatively high confidence event has occurred is identified with an event signal generated by a sensor with a low threshold, with the result that a drop in resolution can be prevented.

Note that, the modifications of each embodiment described above are also applicable to the other embodiment. For example, the uneven array pattern of the filter and sensor as described in the first embodiment with reference to FIG. 3 is also applicable to the second embodiment. Further, the belt-shaped array pattern of the filter and sensor as described in the second embodiment with reference to FIG. 8 is also applicable to the first embodiment.

The embodiments of the present invention can be utilized for acquiring information regarding the surrounding environment of, for example, a game controller, a smartphone, or any kind of moving bodies (vehicles, electric vehicles, hybrid electric vehicles, motorcycles, bicycles, personal mobilities, airplanes, drones, ships, robots, and the like), for performing localization from the positions of surrounding objects, or detecting an incoming object to take evasive action.

In the above, the preferred embodiments of the present invention have been described in detail with reference to the accompanying drawings, but the present invention is not limited to the examples. It is obvious that various changes or modifications could be arrived at by persons who have ordinary knowledge in the technical field to which the present invention belongs within the scope of the technical ideas described in the appended claims, and it is therefore understood that such changes or modifications naturally belong to the technical scope of the present invention.

REFERENCE SIGNS LIST 10, 20: System
100, 300: Event-driven vision sensor
110, 310: Sensor
111, 311: First sensor
112, 312: Second sensor 313: Third sensor
314: Fourth sensor
120, 320: Sensor array
200, 400: Information processing device
210, 410: First processing unit
220, 420: Second processing unit
430: Third processing unit
440: Fourth processing unit

The invention claimed is:

1. A system comprising:
an event-driven vision sensor including a sensor array that includes a first sensor and a second sensor arrayed in a predetermined pattern, wherein,
the first sensor and the second sensor are alternately arrayed in each of a first direction and a second direction orthogonal to the first direction, and configured to detect object movement,
the first sensor being configured to generate: (i) a first event signal when detecting a change in intensity of light larger than a first threshold, (ii) the first event signal having no different characteristics when the change in intensity of light is of a magnitude larger than any and all intensities above the first threshold, and (iii) no first event signal when the change in intensity of light is not larger than the first threshold,
the second sensor being configured to generate: (i) a second event signal when detecting a change in intensity of light larger than a second threshold that is larger than the first threshold, (ii) the second event signal having no different characteristics when the change in intensity of light is of a magnitude larger than any and all intensities above the second threshold, and (iii) no second event signal when the change in intensity of light is not larger than the second threshold; and
an information processing device including one or more processors configured to:
execute first processing when the first event signal generated by the first sensor is received and the second event signal generated by the second sensor is not received, the first processing indicating a first movement of a first object based on the change in intensity of light being larger than the first threshold; and
a execute second processing different from the first processing when the second event signal generated by the second sensor is received, the second processing indicating a second movement of a second object based on the change in intensity of light being larger than the second threshold.

2. The system according to claim 1, wherein
the sensor array further includes a third sensor arrayed together with the first sensor and the second sensor, the third sensor configured to generate a third event signal when detecting a change in intensity of light larger than a third threshold that is larger than the second threshold, and
wherein the the one or more processors are further configured to execute third processing based on the third event signal.

3. The system according to claim 1, wherein
the one or more processors are configured to identify a first event having a first label, and
a second event having a second label, and
wherein the one or more processors are further configured to determine, in a case where a number of the second events is equal to or larger than a predetermined threshold, a location of a device having mounted thereon the event-driven vision sensor only using the second event, and to determine a location of the device using the first event and the second event in a case where the number of the second events is smaller than the predetermined threshold.

4. The system of claim 1, wherein the first threshold corresponds to a luminance change amount associated with a movement of a non-light emitting body, and the second threshold corresponds to a luminance change amount associated with a movement or one or more flashes of a light emitting body.

5. The system of claim 1, wherein, the one or more processors are configured to determine confidence of an event using the second event signal from the second sensor upon detection of the first event signal from the first sensor near the second sensor to achieve high event resolution.

6. The system of claim 1, wherein the first sensor and the second sensor are unevenly arranged.

7. The system of claim 3, wherein the device is a game controller.

8. An information processing device comprising:
memory storing instructions;
one or more processors, that upon execution of the instructions, configured to:
receive one or more event signals, including at least one of a first event signal from a first sensor or a second event signal from a second sensor;
configured to execute first processing when a first event signal is received and a second event signal is not received and further configured to second processing different from the first processing when the second event signal is received, wherein:
the first sensor is configured to generate: (i) the first event signal when detecting a change in intensity of light larger than a first threshold, the first event signal having no different characteristics when the change in intensity of light is of a magnitude larger than any and all intensities above the first threshold, and (ii) no first event signal when the change in intensity of light is not larger than the first threshold,
the second sensor is configured to generate: (i) the second event signal when detecting a change in intensity of light larger than a second threshold that is larger than the first threshold, the second event signal having no different characteristics when the change in intensity of light is of a magnitude larger than any and all intensities above the second threshold, and (ii) no second event signal when the change in intensity of light is not larger than the second threshold, and
the first sensor and the second sensor being alternately arrayed in each of a first direction and a second direction orthogonal to the first direction; and
wherein the first processing is indicative of a first movement of a first object based on the change in intensity of light being larger than the first threshold, and the second processing is indicative of a second movement of a second object based on the change in intensity of light being larger than the second threshold.

9. The information processing device of claim 8, wherein the one or more processors are configured to identify a first event having a first label, and a second event having a second label, and
wherein the one or more processors are further configured to determine, in a case where a number of the second events is equal to or larger than a predetermined threshold, a location of a device having mounted thereon the event-driven vision sensor only using the second event, and to determine a location of the device using the first event and the second event in a case where the number of the second events is smaller than the predetermined threshold.

10. The information processing device of claim 8, wherein the first threshold corresponds to a luminance change amount associated with a movement of a non-light emitting body, and the second threshold corresponds to a luminance change amount associated with a movement or one or more flashes of a light emitting body.

11. The information processing device of claim 8, wherein, the one or more processors are configured to determine confidence of an event using the second event signal from the second sensor upon detection of the first event signal from the first sensor near the second sensor to achieve high event resolution.

12. An information processing method comprising:
receiving one or more event signals, including at least one of a first event signal from a first sensor or a second event signal from a second sensor;
executing first processing upon receiving the first event signal without the second event signal; and
executing second processing different from the first processing when the second event signal is received,
wherein:
the first sensor is configured to generate: (i) the first event signal when detecting a change in intensity of light larger than a first threshold, the first event signal having no different characteristics when the change in intensity of light is of a magnitude larger than any and all intensities above the first threshold, and (ii) no first event signal when the change in intensity of light is not larger than the first threshold,
the second sensor is configured to generate: (i) the second event signal when detecting a change in intensity of light larger than a second threshold that is larger than the first threshold, the second event signal having no different characteristics when the change in intensity of light is of a magnitude larger than any and all intensities above the second threshold, and (ii) no second event signal when the change in intensity of light is not larger than the second threshold, and
the first sensor and the second sensor being alternately arrayed
in each of a first direction and a second direction orthogonal to the first direction, and
wherein the first processing is indicative of a first movement of a first object based on the change in intensity of light being larger than the first threshold, and the second processing is indicative of a second movement of a second object based on the change in intensity of light being larger than the second threshold.

13. The information processing method of claim 12, further comprising:
identifying a first event having a first label, and a second event having a second label;
determining, in a case where a number of the second events is equal to or larger than a predetermined threshold, a location of a device having mounted thereon the event-driven vision sensor only using the second event; and
determining a location of the device using the first event and the second event in a case where the number of the second events is smaller than the predetermined threshold.

14. The information processing method of claim 12, wherein the first threshold corresponds to a luminance change amount associated with a movement of a non-light emitting body, and the second threshold corresponds to a luminance change amount associated with a movement or one or more flashes of a light emitting body.

15. The information processing method of claim 12, further comprising determining confidence of an event using the second event signal from the second sensor upon detection of the first event signal from the first sensor near the second sensor to achieve high event resolution.

16. A non-transitory, computer readable storage medium containing a program, which when executed by a computer, causes the computer to perform an information processing method by carrying out actions, comprising:
receiving one or more event signals, including at least one of a first event signal from a first sensor or a second event signal from a second sensor;
executing first processing upon receiving first event signal without the second event signal; and
executing second processing different from the first processing when the second event signal is received,
wherein:
the first sensor is configured to generate: (i) the first event signal when detecting a change in intensity of light larger than a first threshold, the first event signal having no different characteristics when the change in intensity of light is of a magnitude larger than any and all intensities above the first threshold, and (ii) no first event signal when the change in intensity of light is not larger than the first threshold,
the second sensor is configured to generate: (i) the second event signal when detecting a change in intensity of light larger than a second threshold that is larger than the first threshold, the second event signal having no different characteristics when the change in intensity of light is of a magnitude larger than any and all intensities above the second threshold, and (ii) no second event signal when the change in intensity of light is not larger than the second threshold, and
the first sensor and the second sensor being alternately arrayed
in each of a first direction and a second direction orthogonal to the first direction, and
wherein the first processing is indicative of a first movement of a first object based on the change in intensity of light being larger than the first threshold, and the second processing is indicative of a second movement of a second object based on the change in intensity of light being larger than the second threshold.

17. The non-transitory, computer readable storage medium of claim 16, wherein the actions further comprise:
identifying a first event having a first label, and a second event having a second label;
determining, in a case where a number of the second events is equal to or larger than a predetermined threshold, a location of a device having mounted thereon the event-driven vision sensor only using the second event; and
determining a location of the device using the first event and the second event in a case where the number of the second events is smaller than the predetermined threshold.

18. The non-transitory, computer readable storage medium of claim 16, wherein the first threshold corresponds to a luminance change amount associated with a movement of a non-light emitting body, and the second threshold corresponds to a luminance change amount associated with a movement or one or more flashes of a light emitting body.

19. The non-transitory, computer readable storage medium of claim 16, wherein the actions further comprise determining confidence of an event using the second event signal from the second sensor upon detection of the first event signal from the first sensor near the second sensor to achieve high event resolution.

* * * * *